United States Patent
Lindstrom et al.

(10) Patent No.: US 6,397,122 B1
(45) Date of Patent: May 28, 2002

(54) APPARATUS AND METHOD THEREFOR OF MAXIMIZING THE PRODUCTION RUN SPEED OF A SHEET FABRICATION MACHINE

(75) Inventors: Mikko Lindstrom, Streamwood, IL (US); Jorma Taijonlathi, Kauhava (FI)

(73) Assignee: Finn-Power International, Inc., Arlington Heights, IL (US)

( * ) Notice: Subject to any disclaimer, the term of this patent is extended or adjusted under 35 U.S.C. 154(b) by 912 days.

(21) Appl. No.: 08/612,820

(22) Filed: Mar. 11, 1996

(51) Int. Cl.[7] ............................................. G05B 19/416
(52) U.S. Cl. ......................... 700/145; 700/188; 706/904
(58) Field of Search ......................... 364/472.01, 472.05, 364/472.07, 474.15, 474.28, 474.3, 474.35, 551.02; 318/571; 395/68, 904; 72/441, 446; 83/401, 403.1, 410, 412, 414, 72, 76.6, 76.8; 29/561, 563; 192/125 A; 702/185; 706/904, 58, 4

(56) References Cited

U.S. PATENT DOCUMENTS

| | | | |
|---|---|---|---|
| 5,371,832 A | 12/1994 | Eichfeld et al. | ................ 706/4 |
| 5,422,979 A | 6/1995 | Eichfeld et al. | ................ 706/4 |
| 5,493,502 A | * 2/1996 | Niwa | ...................... 364/474.3 |

OTHER PUBLICATIONS

"Recent Successful Fuzzy Logic Applications in Industrial Automation", by Jörg Gebhardt et al.; published at the 5th IEEE International Conference on Fuzzy Systems, held in New Orleans Sep. 1996.

* cited by examiner

Primary Examiner—Eric B. Stamber
(74) Attorney, Agent, or Firm—Louis Woo

(57) ABSTRACT

To maximize the production run speed of a sheet fabrication machine such as a turret punch press, and yet at the same time maintaining the requisite accuracy for each part produced from the production run, historical data pertaining to the various parameters for effecting the positioning moves of a worksheet are measured and collected using a reference machine or a prototype machine. For each positioning move to be effected, the CNC controller of the system retrieves the historical data from a database and, using that historical data, calculates the various parameters that affect the positioning move. By using fuzzy logic, the controller becomes, in a sense, self teaching, especially if updated historical data are provided to its database store to enhance the accuracy for later positioning moves. In addition to measuring and collecting historical data from reference or prototype machines, static process control (SPC) tests may be performed for different types of worksheets under different loads. The data collected from the SPC tests are stored and can be used as the historical data. Using historical data to calculate the next positioning move, i.e., by using the past to forecast or predict the future, the maximum allowable speed is obtained for each positioning move. At the same time moves that will produce parts that have dimensions that are within the predetermined required accuracy threshold are ensured.

31 Claims, 9 Drawing Sheets

FIG. 10
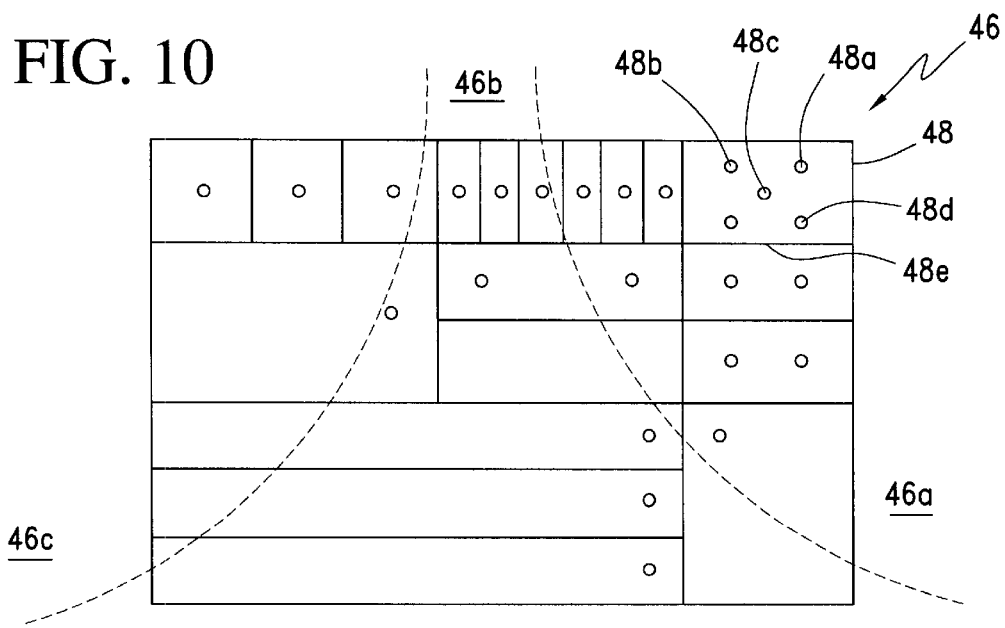
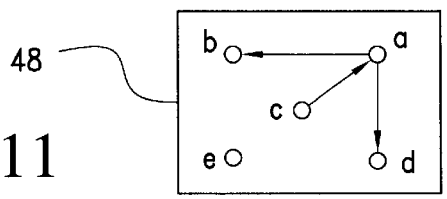
FIG. 11
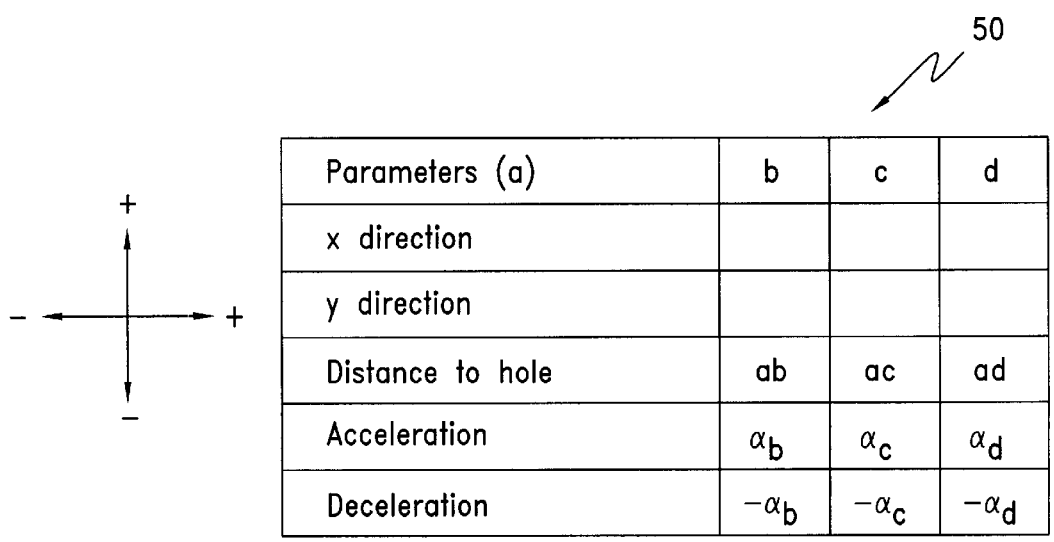
FIG. 12

APPARATUS AND METHOD THEREFOR OF MAXIMIZING THE PRODUCTION RUN SPEED OF A SHEET FABRICATION MACHINE

FIELD OF THE INVENTION

The present invention relates to numerically controlled sheet fabrication centers and/or machines, and particularly relates to an apparatus and method for maximizing the speed of fabricating from a sheet blank, with the dimensional accuracy of the produced parts being maintained above a predetermined threshold.

BACKGROUND OF THE INVENTION

In a production run of a sheet fabrication machine, such as for example a turret punch press in a flexible manufacturing system (FMS) or a sheet fabrication center, large sheet blanks or worksheets are used. This is due mainly to: (1) the capability provided in currently available software that allows an operator/programmer to program fabrication of multiple parts from a single large worksheet, and (2) the increasing size of sheet fabrication machines such as hydraulic turret punch presses that allows large worksheets to be processed. The programming of multiple different parts to be cut from a single worksheet is moreover made possible with the onset of nesting programs which increase the productivity by increasing the material utilization and reducing the inventory of stock materials needed previously for producing different parts from different sheet blanks, as any part can be nested with other parts at any given time when needed. But the demand for just in time production substantially reduces, if not completely eliminates, the time available for testing the suitability of a particular nesting of parts for a given dimensioned worksheet for fast and accurate production of the different parts from the worksheet. However, the paramount requirement for any production runs, including just in time production, remains the same. That is, parts need to be produced by using the fastest possible speed, and the dimension of each of the produced parts has to be within the required design accuracy.

Yet this requirement to produce accurate parts at the fastest possible speed at which a sheet fabrication machine can operate is frustrated up to now because of the deflections and vibrations that are inherent in the structure of sheet fabrication machines. These inherent deflections and vibrations are caused by the moving components of each sheet fabrication machine such as for example the high torque axes drive systems of a turret punch press. The high accelerations from the axes drive systems are in turn introduced to the coordinate table of the turret punch press which typically is made from steel or a combination of light alloy and steel. When supporting loads, the weight of the loads will further cause deflections or vibrations in the mechanical structure of the sheet fabrication machine and its axes guide system. The deflection causing forces increase with the size of the worktable and the size of the worksheet being introduced to the machine. In a conventional turret punch press, the maximum sheet blank size can be five feet by ten feet, or even greater depending on the dimensions of the worktable onto which the worksheet is placed. With the thickness of each sheet blank typically being up to or sometimes even greater than $5/16$ inch, substantial forces are loaded onto the mechanical structure of the sheet fabrication machine.

Attempts have been made to strengthen the structure of the sheet fabrication machines so that the amount of structural deflections and vibrations is reduced. However, the design of a non-deflecting mechanical structure for a sheet fabrication machine capable of handling high loads with high positioning speed would be very expensive, if not down right impossible to achieve with present day technology.

Prior to the instant invention, to produce accurate parts from a sheet fabrication machine, it is common practice for an operator or programmer to slow down the table speed of the machine via program codes or commands, or both, input to the manual control panel. In addition, the acceleration and deceleration rates are decreased to reduce forces and vibrations in the sheet fabrication machine. This slowing down of the movement speed and also the acceleration and deceleration rates does produce accurate parts. However, this methodology requires constant interfacing by the operator or programmer of the machine, and is highly dependent on the individual skills of the operator/programmer. Another method previously introduced by Finn-Power to produce accurate parts from a sheet fabrication machine is the use of programmable dwells prior to releasing the punch stroke. This allows a worksheet to stop its vibrations and be positioned correctly prior to being punched. All of the above-noted techniques of producing accurate parts from a worksheet involve the adjustment of various parameters manually, either from the programming station or from the input terminal connected to the computerized numerical control (CNC) panel of the sheet fabrication machine.

To insure that accurate parts are indeed produced by the above-noted techniques, the values used for the different parameters are usually input with a safety margin of error. This however results in the sheet fabrication machine not being used to its fullest potential, thus resulting in longer production time and lesser throughput. Furthermore, depending on the skill of the operator/programmer, even with the input of what are deemed to be "safe" values for the various parameters, parts produced from the machine oftentimes are below the accepted values and are scraped, and the production run has to be repeated.

BRIEF DESCRIPTION OF THE PRESENT INVENTION

To achieve the fastest possible production speed and the highest possible throughput for every conceivable nesting of parts from a sheet blank, each individual positioning move of the sheet blank is independently evaluated based on, but not limited to, a number of parameters such as positioning direction, the distance of the move, the location of a hole to be punched on the sheet blank, the rigidity and the weight of the sheet blank, and the gravity center of the sheet blank relative to where the sheet blank is held by the positioning clamps or other positioning means. Based on a determination of how the various parameters each would affect the accuracy of parts produced from a sheet blank, historical data previously collected is input to the processor of the sheet fabrication system to calculate, among other things, the respective values of the maximum allowable positioning acceleration, deceleration, punch speed and delay prior to the punch stroke for each individual punch stroke. Given the fact that each positioning move is calculated to proceed at the fastest possible speed with the minimum safe positioning time for the required accuracy, the fabrication of parts from the sheet fabrication system is therefore optimized to provide the highest part throughput with the required accuracy.

To enable the processor of the sheet fabrication system to calculate each positioning move optimally, fuzzy logic, either in the form of software or as an add-on module that can be obtained commercially, is provided to the processor of the system. Data relating to the required hole to hole tolerance for a part is input to the processor for each type of sheet blank so that the processor of the system can calculate the optimal positioning move to maximally produce parts from each sheet blank type. Depending on the tolerance required, the processor can instruct the machine to operate at a given pace—setting positioning parameters to effect a "slower" production speed, i.e. less productivity in quantity but better quality, when the tolerance for producing a particular positioning requirement is high, and faster production speed, i.e. higher productivity, when the tolerance requirement is "loose". Furthermore, by providing historical data to the fuzzy logic, the processor of the system is able to learn to make positioning corrections to compensate for normal wear of the machine, the particulars in some areas of the worktable of the machine and other happenstance that relates to the machine.

Since different machines of different models of machines have inherent different characteristics due to the tolerances provided in the manufacture of the machines and their respective coordinate axes motion systems, a static process control (SPC) test can be run to produce data from different loads for the different machine models at different conditions. The produced data is input to the processor of the system, and specifically to the fuzzy logic module, which then uses the data to calculate optimized individual moves for that particular machine. The data may be referred to as compensating data.

The compensating data can be entered continuously, when available from parts produced from a particular machine. The dimensions of each of the produced parts are measured and input to the processor of the system so that the various parameters stored therein for calculating each positioning move are updated for maximum productivity and required accuracy. In place of data measured from parts produced, additional SPC data, which had previously been stored in a data base, could be reused to continuously update the parameters used by the processor of the machine to calculate the positioning moves that are necessary for that machine to produce parts from different types of sheet blanks. The condition of the machine is therefore continuously updated so that the various parameters for each of the positioning moves can be adjusted on a real time basis.

BRIEF DESCRIPTION OF THE FIGURES

The above-mentioned objectives and advantages of the present invention will become more apparent and the invention itself will best be understood by reference to the following description of an embodiment of the invention taken in conjunction with the accompanying drawings, wherein:

FIG. 10 shows a nested worksheet;

FIG. 11 is an exemplar part to be produced from the worksheet of FIG. 10;

FIG. 12 is an exemplar table illustrating some of the parameters used by the processor of the sheet fabrication system for calculating positioning moves;

FIG. 13 is a simplified illustration of the relationship between the positioning and punching mechanisms of the sheet fabricating machine, and the processor and other components of the sheet fabrication center to which the sheet fabrication machine is an integral part of.

DETAILED DESCRIPTION OF THE PRESENT INVENTION

Figure 1A:
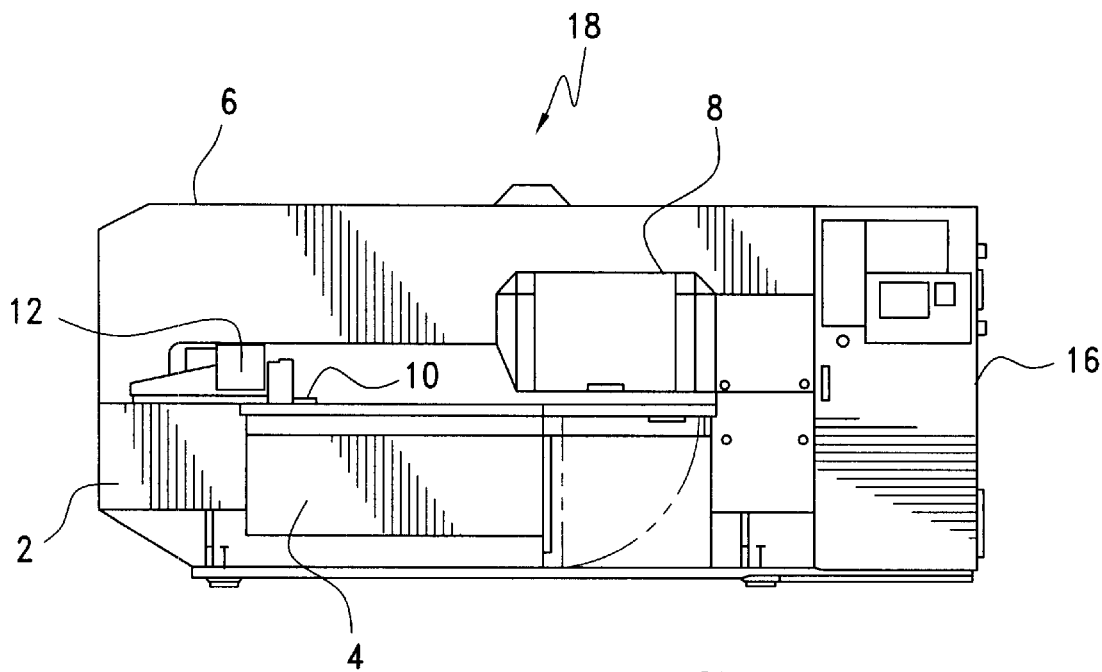
FIG. 1A is side view of a sheet fabrication machine.
Figure 1B:
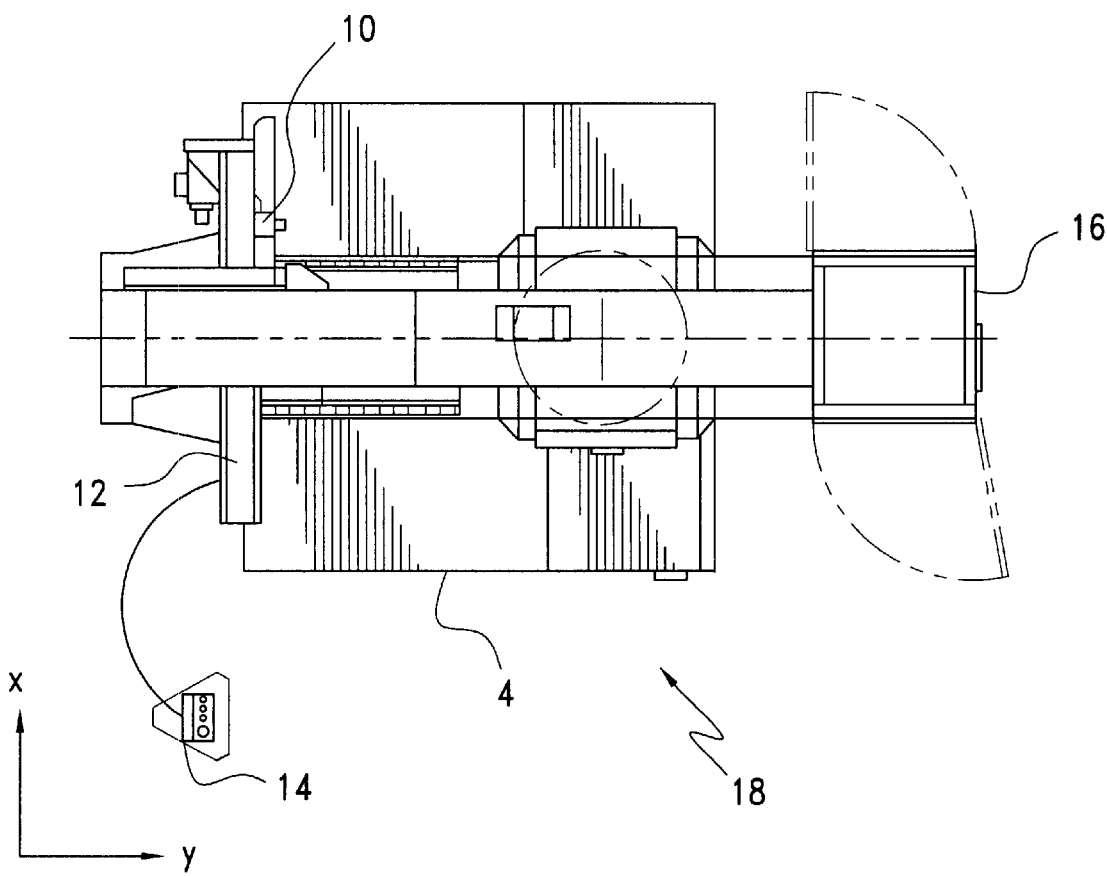
FIG. 1B is a plan view of the FIG. 1A sheet fabrication machine.

With reference to FIGS. 1A and 1B, a sheet fabrication machine such as for example a turret punch press in a sheet fabrication center is shown to have a base 2 to which is coupled a worktable 4. The area of the worktable is shown in the plan view of FIG. 1B. Mounted to base 2 is a frame 6 to which a turret may be mounted. Tools are mounted along the periphery of the turret for punching holes in a sheet blank or worksheet being held by clamps 10 mounted to a slide and a carriage 12. Carriage 12 is moveable along the x axis while holder clamps 10 (or any other means to move the workpiece), by means of the slide being movably coupled to carriage 12, are moveable along the y axis. See FIG. 1B. Accordingly, a worksheet held by clamps 10 can be moved anywhere along the work area of worktable 4.

Although not shown, a punch, and its related drive mechanism, is positioned to drive a tool mounted to a turret (or any other tool carrier since where the tool is mounted is not important) that has been rotated to be underneath the punch. The functioning of the sheet fabrication system can be gleaned from a monitoring unit 14 that includes a number of identification lights. The operation of the sheet fabrication system is controlled by a computer numerical controlled (CNC) system or controller 16 that may comprise a programmable logic controller (PLC). In sum, the sheet fabrication system shown in FIGS. 1A and 1B is representative of a Finn-Power turret punch press having for example model Number TP2525I. Other models of Finn-Power turret punch presses or other CNC controlled turret punch presses are also understood to be represented by the system of FIGS. 1A and 1B. For convenience, the sheet fabrication system, or the turret punch press, can simply be referred to as sheet fabrication machine 18.

Figure 2:
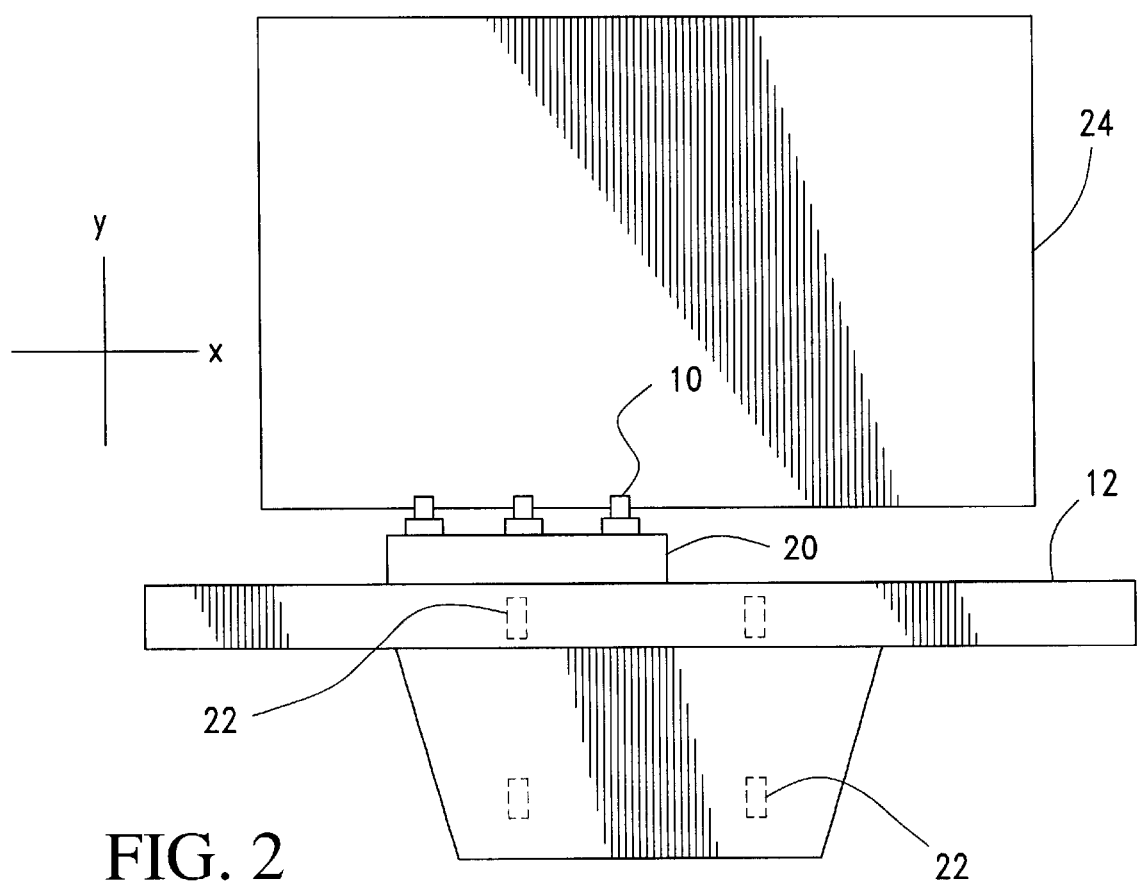
FIG. 2 is simplified top view illustrating the carriage, slide and clamps of the FIG. 1 machine.
Figure 3:
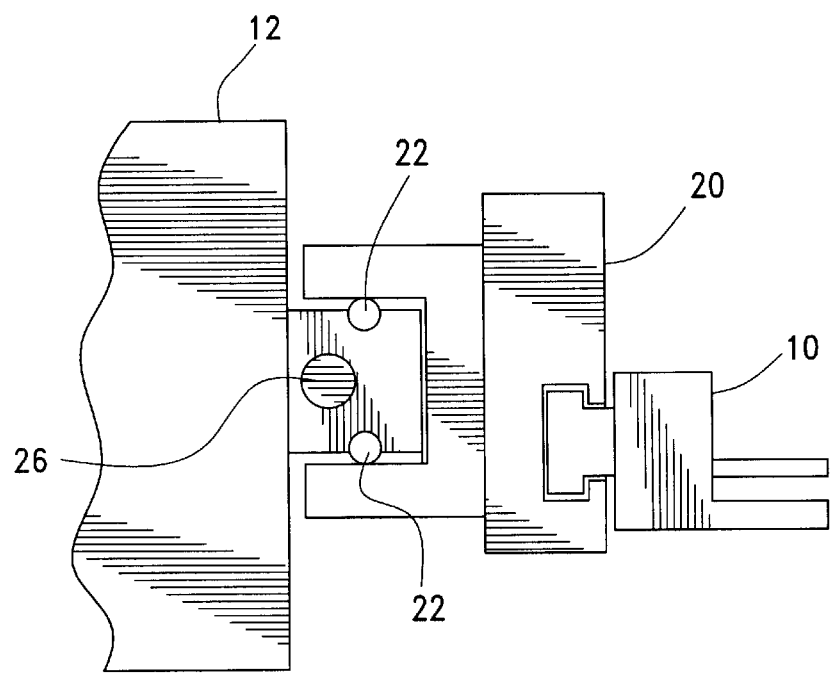
FIG. 3 is cutaway side view illustrating the relationship between the carriage, the slide and the positioning clamps shown in FIG. 2.

The mechanism for moving a worksheet along the work area of the worktable of machine 18 is shown in FIG. 2. As illustrated, three holders, such as the programmable clamps disclosed in U.S. Pat. No. 4,658,682, the disclosure of which being incorporated by reference herein, are mounted to a slide 20. As best shown in FIG. 3, slide 20 is turn is movably mounted to carriage 12 so as to be slidable along bearings 22. Thus constructed, slide 20, and therefore worksheet holders 10, are movable along the x axis, while carriage 12 is movable along the y axis. Thus, the worksheet, for example 24 shown held by clamp holders 10, is moveable along both x and y directions. Carriage 12 is moveable along the y direction by means of four bearings 22. Slide 20 is moveable along carriage 12 by means of a ball screw 26.

To fabricate parts from a worksheet, such as for example sheet blank 24, the worksheet has to be held by clamps 10, or any other workpiece holding means, and positioned by a combination of the movements of slide 20 and carriage 12. However, in instances where large worksheets having dimensions such as for example 4'×10' or 5'×10' are used in a turret punch press machine, inaccurate parts may be produced from the worksheet. This is due to the fact that every machine, due its mechanical construction, will vibrate when subjected to forces or movements. The deflections or vibrations tend to become exaggerated at the outer fringes of the machine, or in the case of worksheet being held by clamps of a turret punch press, the outside portions of the worksheet. These vibrations or deflections, although not noticeable at low moving speed, such as for example when the worksheet is not moving or its movement has substantially been slowed down, become amplified when the worksheet is moved at either high acceleration or deceleration rates. Moreover, for conventional Finn-Power type hydraulic turret punch presses where over 1,000 hits per minute is the norm, parts that are produced from the worksheet which may have the required accuracy at a lower hit rate become inaccurate parts due to the large forces required to both accelerate and decelerate the worksheet to position the different locations of the worksheet underneath the punch for punching.

Another factor that causes deflections and vibrations at the outer fringes of a machine that in turn increases the inaccuracy of parts produced from a worksheet is the natural degradation of the mechanical life of the machine. In other words, the older the machine, the greater the chances that the components of the machine have worn down, thus causing inaccuracies to be added to parts punched from the machine.

The different components such as the slide, carriage and clamps can be made very rigid to lessen potential vibrations and deflections. However, by adding rigidity to the components, the weight of the machine is increased, which in turn increases the power requirement of the motors that drive the various moveable mechanisms. Furthermore, adding weight to certain points of a machine is a good solution only up to a certain point, because the cost of providing complete rigidity to a machine, if such is indeed possible, becomes so prohibitively expensive that it is beyond the reach of most users. Moreover, to find materials for the drive system that will last any length of time in production use with heavy weights is difficult. Lastly, as with any mechanical system, the x/y carriage system of a sheet fabrication machine has a given critical vibration frequency (Hz) that causes the amplitudes of the vibrations to be amplified.

Figure 4A:
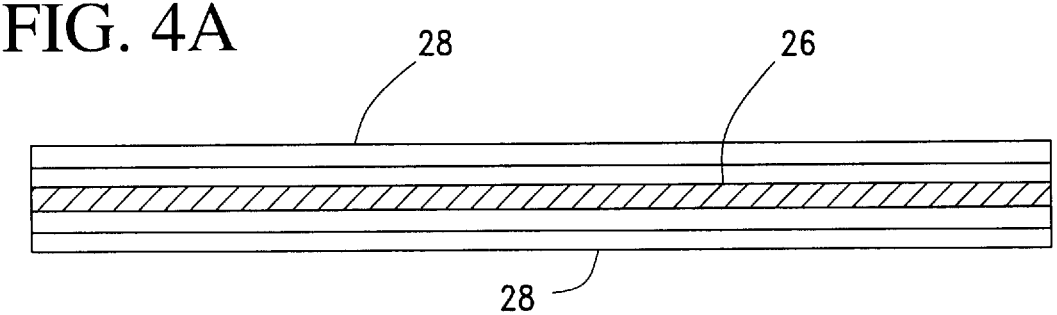
FIG. 4A is an exposed view of a ball screw drive mechanism of the FIG. 2 carriage.
Figure 4B:
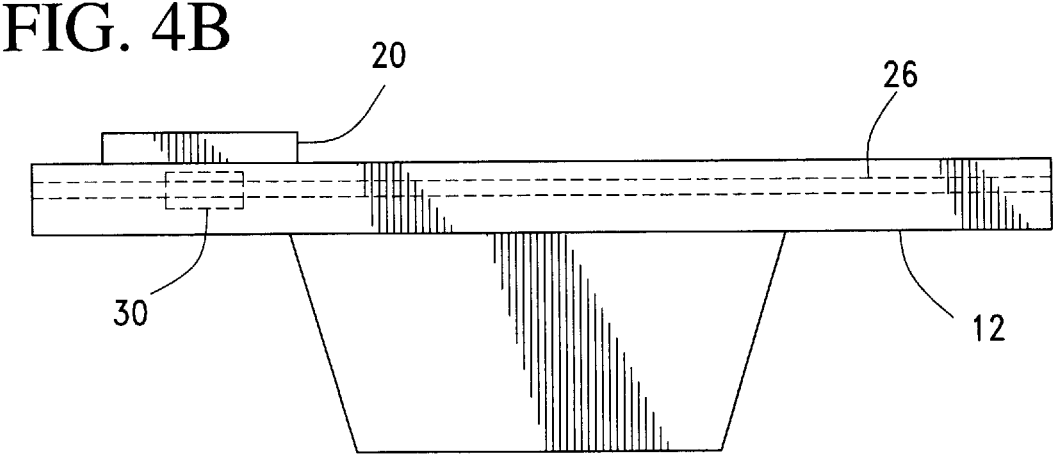
FIG. 4B shows the integration of the ball screw drive mechanism to the carriage.

FIGS. 4A and 4B illustrate more clearly the interaction between the slide and carriage 12. Specifically, slide 20 is mounted to ball screw 26, which is fittingly interposed between two guides 28. The ball screw in turn is movably coupled to carriage 12 and slide 20 is movably mounted thereto with a nut 30 so that slide 20 is moveable along carriage 12. The fact that there are various components movably coupled to each other means that various types of vibrations and deflections occur at various points of machine 18, particularly when a work piece such as 24 is grasped by clamps 10 and is being moved by slide 20 and carriage 12.

Figure 5:
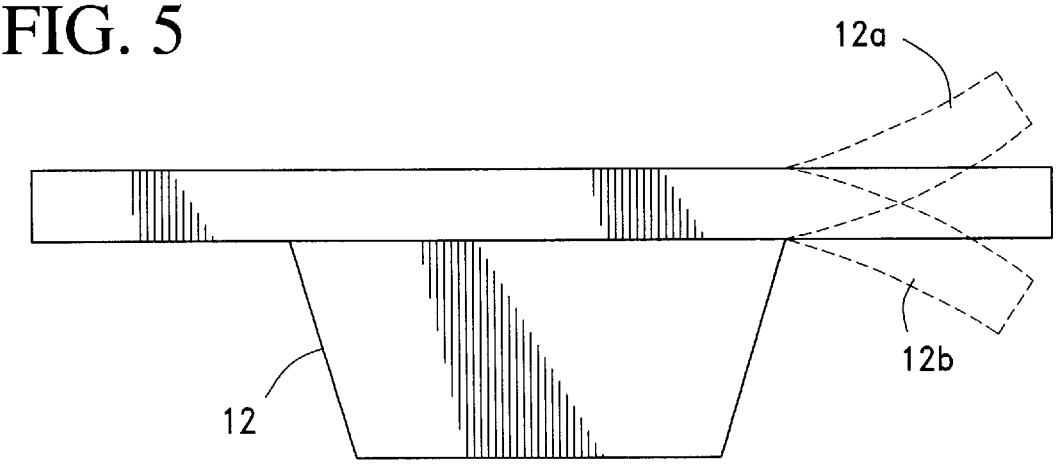
FIG. 5 is a simplified plan view of a carriage showing possible deflections that may occur at one arm thereof.

FIG. 5 illustrates the deflections of the extension arm of carriage 12, albeit somewhat exaggeratedly. As shown, due to the forces exerted against carriage 12 and the inherent structure of the machine, the arm of carriage 12 may be deflected either in the direction as shown in 12a or in the direction identified as 12b.

Figure 6:
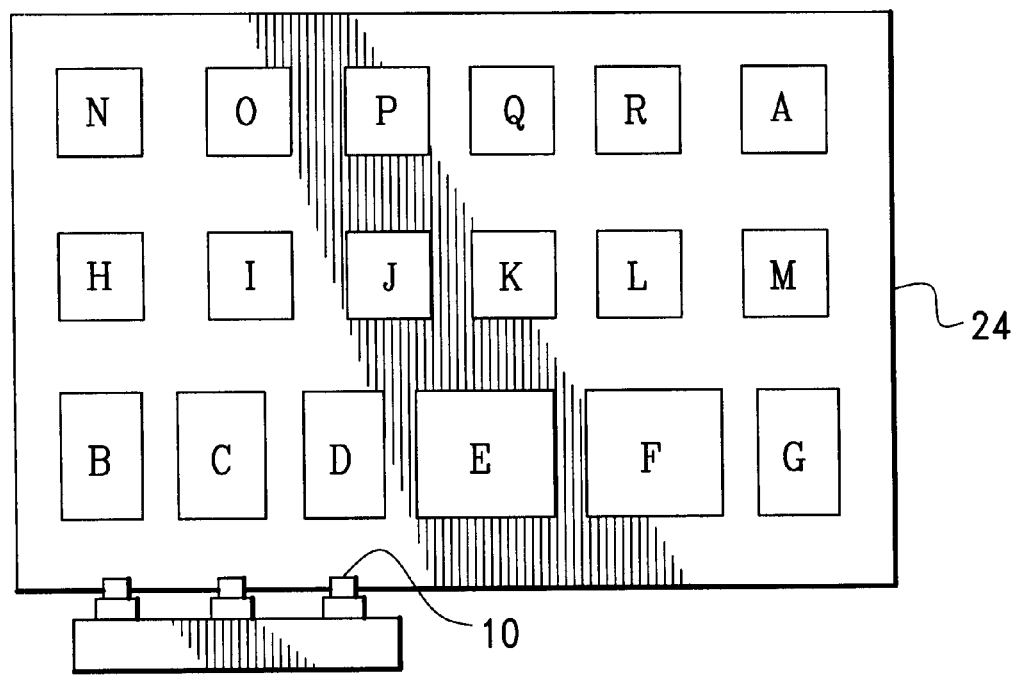
FIG. 6 illustrates the holding of a sheet blank by the positioning clamps of the sheet fabrication machine.

Focus to FIG. 6 where a worksheet 24 is shown to be held by clamps 10. From experience, it is known that certain areas of a sheet blank, such as worksheet 24, due to lack of support or the placement of clamps 10, are more susceptible to deflections or vibrations than other places. For the exemplar worksheet 24 shown in FIG. 6, which incidentally shows a nesting of various parts to be produced from the worksheet, it is apparent that there is less support at the location of worksheet 24 where part A is located than where parts B, C and D are located. In fact, for our exemplar worksheet 24, it is assumed that some of the parts produced therefrom would have the required accuracy while others would not, if a conventional turret punch press is used. For example, parts B, C and D as well as parts that are located proximately thereto, when produced, would have the required accuracy. However, parts such as A, R, M, N, G and O would not.

The reason that parts such as A, N and R produced from worksheet 24 may not have the required accuracy is due to the fact that the regions of worksheet 24 wherefrom those parts are produced do not have sufficient rigidity or support and therefore are subjected to the various forces and structural deflections and vibrations noted above. This is particularly true when the production run is at a high speed under dynamic conditions where a load is placed onto the sheet, and clamps 10 hold the sheet at a given location for positioning.

Prior to the instant invention, in order to produce an accurate part at the far reaches of a worksheet, a programmer/operator has to gauge, using his experience and expertise, how best to punch the holes in those far away regions. Oftentimes the operator compensates for the structural deflections or vibrations by slowing down the table travel speed at those regions so that the deflections and vibrations would substantially subside. Needless to say, to produce accurate parts from a worksheet becomes an art form depending on the expertise of the operator/programmer. Moreover, it becomes a matter of trial and error. In other words, the operator has to determine the acceleration rate, deceleration rate, the delay of time before a punching operation occurs, the momentum that takes place as the worksheet is moved, the center of gravity of the worksheet, the weight of the worksheet, etc., in determining the positioning move(s) that he needs to make in order to punch a hole at a given area in order to effect a part from that given area of the worksheet with the required accuracy.

Figure 7:
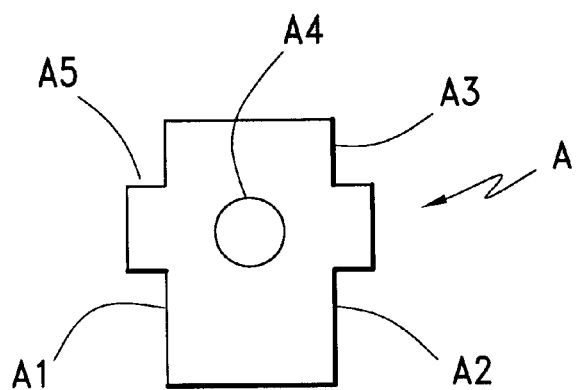
FIG. 7 is a plan view of an exemplar part produced from the sheet blank of FIG. 6.

An example of an inaccurate part such as A produced from worksheet 24 is shown in FIG. 7. As shown, part A has five prominent features, namely A1, A2, A3, A4 and A5. For the example at hand, features A1 and A2 may be produced accurately, while features A3, A4 and A5, when punched, do not have the required accuracy. One way to increase the accuracy of features A3, A4 and A5 is to take into consideration the parameters that are used for effecting those features and changing some of those parameters, such as for example putting in a time delay before each punching or nibbling hit, in order to allow the structural vibrations and deflections to settle down substantially so that the accuracy of features A3, A4 and A5 would be within the required or predetermined accuracy threshold.

In order to produce parts with the required accuracy from all regions of a worksheet without an operator having to intuitively adjust the various parameters, a set of base data, or historical data, is collected from a prototype or reference sheet fabrication machine performing numerous operations that involve different clamping locations. In the case of a turret punch press, holes are made around a test worksheet which, coincidentally, is representative of a worksheet having a given dimension with a given weight. All the punched holes are then measured by a conventional coordinate measuring apparatus. The results from the measured holes are input to a table based on the types of parameters that were used. Other sample runs are then effected to obtain additional tables each containing different values for the determined parameters. Enough historical data needs to be created for each machine model. For example, one set of historical data needs to be created for the above mentioned TP2525I model turret punch press, while a different set of historical data needs to be created for Finn-Power turret punch presses having model number TP2000I, etc.

This historical data is input to a database store in the CNC controller of the machine by means of, for example, a diskette. Such historical data may include the nesting of different parts. For example, in nesting different parts such as for example those shown in FIG. 6, the computer aided manufacturing (CAM) system takes all the moves of one tool that may be used in more than one of the different parts and optimizes the travels between hits throughout the entire sheet, so that the table travels the shortest possible distance to all of the hole locations.

Given the historical data, to produce parts from a worksheet, once the operator has programmed the processor to produce parts from a worksheet having a given dimension with the to be produced parts being nested appropriately on the worksheet, parameters such as acceleration, deceleration, and time delay prior to punching for optimal positioning moves to produce the parts from the worksheet are calculated by the processor of the CNC and/or PLC so that the production of parts from the worksheet is performed at the fastest allowable speed, and therefore obtaining the highest possible productivity, without affecting the accuracy of the parts produced. For example, if parts such as A and R, nested as shown in FIG. 6, were to be produced from worksheet 24 with clamps 10 holding worksheet 24 at the locations as shown, the various positioning moves for producing each of those parts from worksheet 24 are calculated.

For instance, parameters for each positioning move for effecting the different features A1–A5 is calculated based on the historical data to ensure that the required accuracy be maintained when those features are effected. To elaborate, to ensure that the required accuracy for feature A3 is met, the positioning move for placing the location of worksheet 24 where feature A3 is to be punched out may include an increase in the value of the punch time delay, i.e. the time prior to releasing the hit command, so that the deflections and vibrations of worksheet 24 resulting from the structure of the machine, the attributes of worksheet 24 and the movement of worksheet 24, can subside sufficiently before punching takes place so that feature A3 can be effected with the required accuracy. In other words, the deceleration to the position is made "smoothly", as for example by changing the deceleration value during the deceleration move. The amount of delay time of course has been ascertained to be the minimal time so that the production run could proceed at the fastest allowable speed. The same type of consideration given to obtain the required accuracy for feature A3 is applied to features A4 and A5 for the exemplar part A shown in FIG. 7.

The measurement of the parts produced from each production run can be collected to update the data stored in the memory of the controller to enhance the required accuracy and the fastest allowable production run speed for the machine. This is advantageous for each machine since even though each machine is substantially the same as the reference (or prototype) machine from which the historical data was collected since both machines have the same model number, there nonetheless are differences between the reference machine and the machine at the customer's premises since there are tolerances allowed for the manufacture of the different machines. Thus, by allowing the database to be updated with data collected from each production run means that the accuracy of parts produced from the machine that is performing the production run is enhanced. This is particularly necessary since each machine is subjected to wear and tear and other factors that may affect its accuracy.

Figure 8:
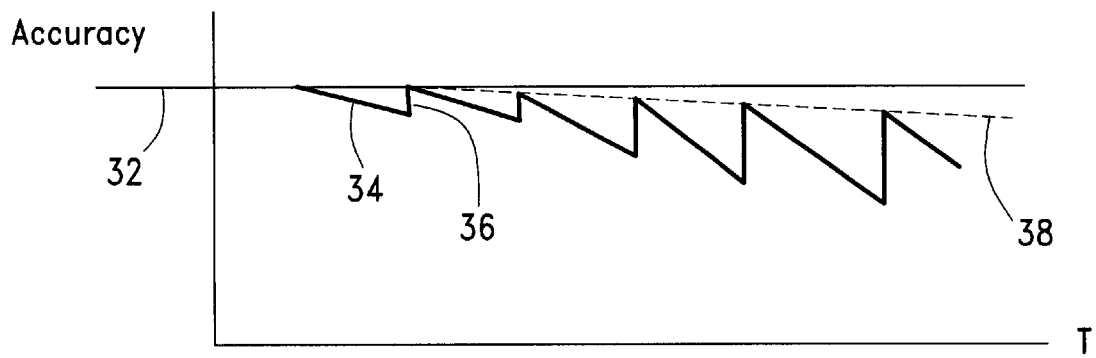
FIG. 8 is a graph illustrating the accuracy of parts produced from a given sheet fabrication machine relative to time.

In FIG. 8, the accuracy of the machine is shown to decrease with time. However, preventive maintenance such as greasing the various joints and ball bearings of the machine return the accuracy of the machine, hopefully, to when it was new. In FIG. 8, the optimal accuracy of the machine is designated by line 32. As time passes, the performance of the machine, designated by the zigzag line 34, is shown to decrease until, for example, maintenance is performed on the machine at time 36. This steady decline of the machine's accuracy with time is shown by dotted line 38. The machine's accuracy, or rather more accurately its capability to produce accurate parts, degrades over time. That notwithstanding, the accuracy of the parts produced can be compensated by the instant invention process of calculating each positioning move.

Figure 9:
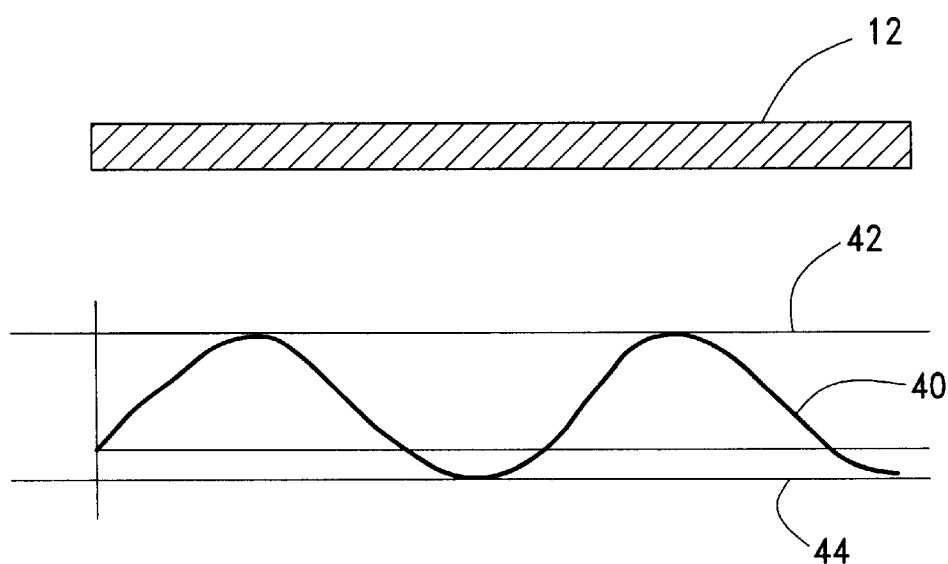
FIG. 9 shows the deflections and vibrations that occur in the moving mechanism of a sheet fabrication machine as a function of time.

Another factor that may affect the accuracy of the parts produced by a machine is the so called backlash due to the ball screw 26 mechanism that drives slide 20 relative to carriage 12. There is incorporated into the machine a backlash correction. But nonetheless, typical of CNC machines, along the length of the ball screw there is a linear error that varies over time, as shown by line 40 in FIG. 9. The backlash error, even though it may be within the tolerance limits of 42 and 44, nonetheless can create error for parts to be produced, as each positioning move is dependent on the relative movements of slide 20 and carriage 12. The error data from the ball screw can be collected as historical data from the reference machine, and also from each individual machine, as a parameter that needs to be taken into account. By thus taking into account the time dependent wear and tear as shown in FIG. 8 and the inherent backlash problem of each machine, additional factors or parameters may be added to each positioning move for compensating degradation and backlash errors.

To optimize the differences between different machines due to the tolerances that are required for the manufacture of the machines and their respective coordinate axes motion systems such as carriage 12 and slide 10, one or more static process control (SPC) tests may be performed to produce data from different worksheet loads under different conditions. This data from a SPC test is entered into the CNC controller of each machine for processing. For machines that are connected to a network, the SPC test data may be partially or fully downloaded to the CNC controller from any storage means connected to the network. To enhance the processing, fuzzy logic, to be discussed infra, may be used.

With reference to FIGS. 10 and 11, positioning moves effected on an exemplar worksheet 46 are discussed. For this discussion, it is assumed that exemplar worksheet 46 is divided into a number of areas, namely 46A, 46B and 46C. In a nesting environment, different parts are nested on worksheet 46. Assume that each of the areas has different accuracy ranges. Therefore, the different holes punched into worksheet 46 have different accuracy ranges. Tables incorporating the various data for generating the different holes with the required accuracy are generated.

For the instant invention, the controller does not know and does not have to know that each hole relates to a particular part. For example, the controller does not need to know that holes 48a, 48b, 48c and 48d are to be holes made within part 48. However, the controller does know, from the data stored in the tables, the areas for the particular type of worksheet that each of those holes are to be punched. Thus, assuming that the controller, for simplicity sake, has subdivided worksheet 46 into three different zones, namely 46A, 46B and 46C, the holes at issue, namely 48a–48e, are all shown to be located within zone 46A. The only thing that the controller of the machine is concerned with, therefore, is the accuracy of the part which is reflected by the relative positioning of holes 48a–48e within part 48 for this instance.

Thus, with reference to FIG. 11, the accuracy that is required is determined by the distance separating the holes, for example, along the x direction between holes a and b, designated as $\delta x_{ab}$, and the distance separating holes a and d, i.e. $\delta y_{ad}$. Given that the distance between holes a and b is $\delta_{ab}$ and is at −180° (assuming that hole a is punched before hole b), and given that parameters, such as those shown in FIG. 12, are provided, the controller can calculate the positioning parameters for moving from point a to point b so that holes may be respectively punched at point a and then at point b at the fastest possible productivity speed, while still maintaining the required distance accuracy separating points a and b.

To achieve this, as shown in FIG. 12, the controller is provided with parameter ab to reference the distance between holes a and b. Taking the historical data into consideration in determining the deflections and vibrations of the machine and worksheet 46, a given acceleration such as $\alpha_b$ is provided to instruct the position drive mechanism of the machine to move worksheet 46 with an acceleration of $\alpha_b$ towards the location where hole 48b is to be punched after the hole at position 48a is punched. At the same time, a deceleration parameter $-\alpha_b$ is also provided to the position drive mechanism to slow down the movement of worksheet 46. Positioning can also be made by using several decelerations (or deceleration rates) during the positioning move to effect a "dampened" soft positioning motion. Using this combination of acceleration and deceleration parameters $\alpha_b$ and $-\alpha_b$, the position drive mechanism effectively moves position 48b of worksheet 46 at the fastest allowable speed underneath the punch. Hence, the acceleration and deceleration parameters, in combination, provide for an effective movement of an area of the worksheet from a first point to a second point, as for example from point 48a to point 48b.

Similar sets of parameters are also provided for the exemplar holes adjacent to hole a for part 48. See FIG. 12. For the positioning movement between points 48a and 48d, insofar as the movement is at −90°, a different set of parameters is used. Similarly, as shown in FIG. 11, a positioning movement is effected from position 48c to 48a. Given the fact that this movement is at approximately 45° in the positive direction, yet a different set of parameters is required to move position 48a of worksheet 46 at the fastest possible speed underneath the punch. The required accuracy or distance separating the holes punched at positions 48c and 48a is of course maintained so that part 48 may be produced with the required accuracy.

Even though there are only five different parameters shown in FIG. 12, it should be appreciated that in actuality there are more. For example, some of the other parameters for each positioning move—in addition to the distance, position directions, maximum allowable acceleration and deceleration rates—may also include the location of the hole on the worksheet, the rigidity of the worksheet, the weight of the worksheet, the gravity center of the worksheet in relationship to how the worksheet is being held by the clamps for movement, the punch speed of the punch as driven by the punch drive mechanism, and, not the least, the time delay provided to the punch drive mechanism for delaying each of the punch strokes individually.

Time delay is different for each punch stroke, as each hole to be made on a worksheet, as was mentioned previously, may be punched only after the appropriate location of the worksheet has been positioned underneath the punch. It is also necessary that the vibrations and deflections of the machine and worksheet be subsided sufficiently before a hole to an accurate location may be punched. Thus, with reference to worksheet 46 shown in FIG. 10, the time delay provided for punching hole 48a, for example, is greater than the time delay provided for punching any of the holes shown in zone 46B. Further, the time delay for punching hole 48c, for this example, is assumed to be less than the time delay provided for punching hole 48a, but yet greater than the time delay provided for punching hole 48e. And depending on where the last operation of the machine was with respect to the worksheet, the parameters for the next positioning move to be calculated by the machine is accordingly different.

To enable the controller to calculate the parameters for each individual positioning move, fuzzy logic, which may be provided as software or as an add-on module, is incorporated into the processor of the controller of the instant invention system for calculating the various parameters based on historical data. In collecting the historical data it is important that the conditions on how the subject accuracy data was achieved are carefully recorded so that correct conclusions can be drawn in the "fuzzy". This is similar to an operator doing his adjustments where he needs to know the start level of parameters before successful adjustments can be made. Such a fuzzy logic module may be purchased, for example, from the Siemens Company or any other fuzzy logic manufacturers.

Essentially, fuzzy logic is a structured, model-free estimator that approximates a function through linguistic input/output associations. It is used where ambiguity or vagueness is common. A typical fuzzy logic system comprises a rule base, membership function, and inference procedure. Moreover, the fuzzy logic can learn the moves that can cause a structure such as for example a turret punch press to reach the aforementioned critical vibration frequency whereat the amplitudes of the vibrations begin so that the accelerations, decelerations and other positioning parameters that cause this problem to arise are avoided. Fuzzy logic is particularly useful for the instant invention inasmuch as how the different holes are to be punched on a worksheet may not all be clear. To wit, in typical sheet metal part production, there are uncounted number of different parts and different blank sheets, thus resulting in many different possible combinations, potentially billions, of positioning moves.

For example, with reference to FIG. 11, as was discussed previously, the angle that worksheet 46 has to be moved from point 48c to 48a is determined to be 45°. However, in actuality the angle may be 43°, or for that matter 46°. Thus, the input provided to the fuzzy logic module is not as clear as it should be. And the fuzzy logic module, upon being provided with a somewhat "fuzzy" input, uses a rule base to inference the angle that the worksheet has to be moved from position 48c to 48a. Putting it simply, fuzzy logic is basically a multi-valued logic that allows intermediate values to be defined between conventional evaluations like yes/no, true/false, black/white, etc. In essence, it attempts to apply a more human-way of thinking in the programming of computers. A more detailed discussion of fuzzy logic basics may be obtained from Allen Bonde at Internet site abonde @ gte.com. The classic papers relating to fuzzy logic is by Zadeh, L. A., "Fuzzy Sets" Information and Control Volume 8, pps. 338–353, (1965) and Zadeh, L. A., "Outline to a New Approach Through the Analysis of Complex Systems and Decision Processes", IEEE Transactions on Systems, Man and Cybernetics, SMC-3, pps. 28–44, (1973).

The parameters calculated for each positioning move can be enhanced if data relating to each worksheet that has just been finished by the machine is measured and collected and provided to the processor. Thus, the historical data stored in the memory of the controller can be updated with reference to the specific machine. With such updating, the accuracy whereby each machine fabricates parts from the same type of worksheet is increased.

Figure 13:
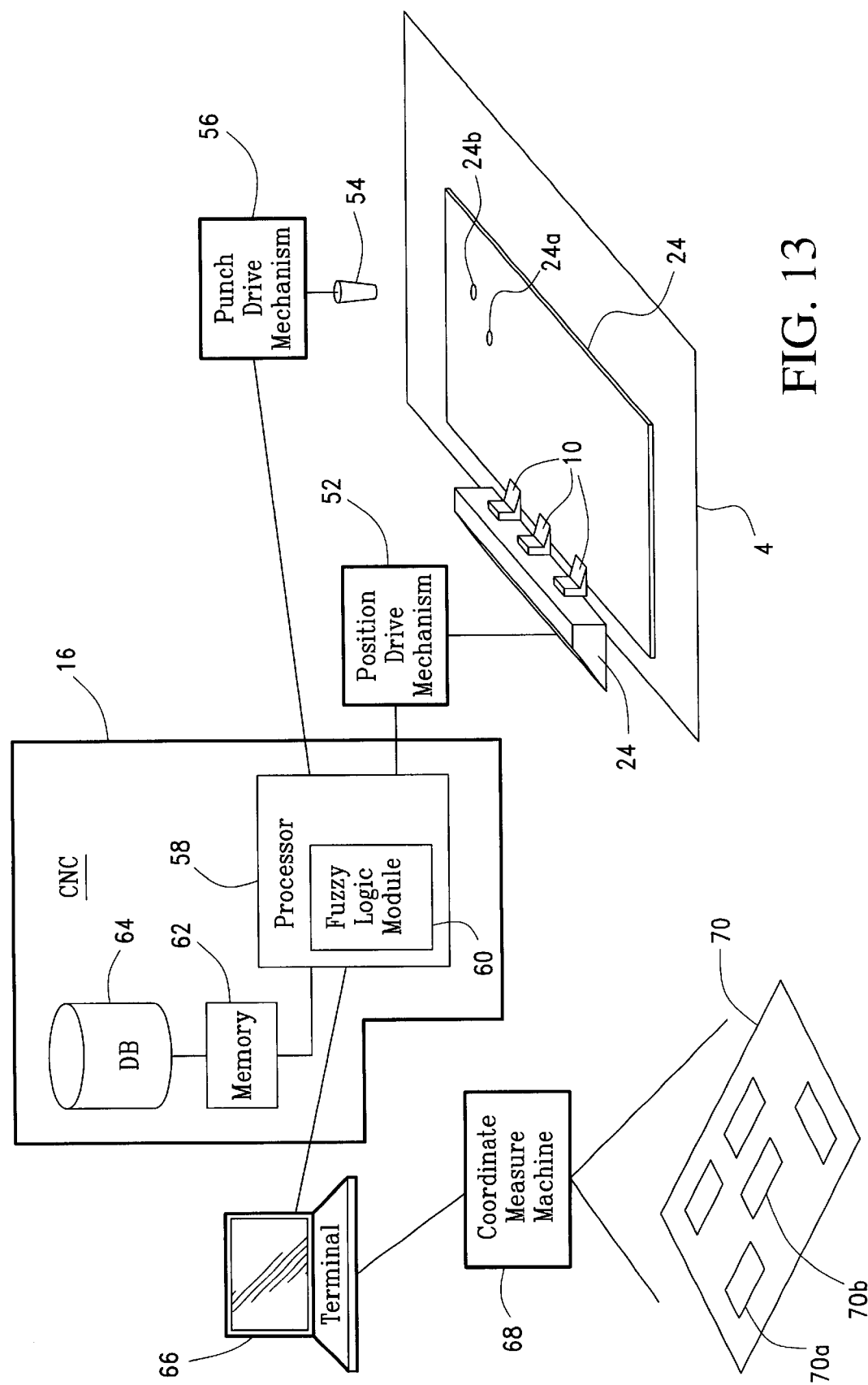

With reference to FIG. 13, the inter-relationship between the CNC controller and the relevant mechanisms of the sheet fabrication machine of the instant invention is shown. As illustrated, the pertinent components of the sheet fabrication machine, for this discussion, are at the work area 4 onto which worksheet 24 is placed. The worksheet is grasped by clamps 10 which are mounted to slide 20 (not shown), which in turn is coupled to carriage 24. For this discussion, carriage 24 is assumed to comprise both slide 20 and the carriage so that it can move in both x and y directions. The movement of carriage 24 is directed by a position drive mechanism 52, and the punching of holes, such as 24a and 24b, is done by a punch 54, which is driven by punch drive mechanism 56. Punch drive mechanism 56 and position drive mechanism 52 are each controlled by CNC controller 16 (or PLC) and specifically by processor 58 thereof. Inside processor 58 there is incorporated either fuzzy logic software or hardware which is embodied by a fuzzy logic module 60.

Connected to processor 58 is a memory 62 that contains the various tables such as 50 shown in FIG. 12. Each of these tables contains parameters that are used to calculate the parameters for positioning moves with reference to a particular location of an exemplar worksheet such as 24. Of course, different parameter tables are provided for different types of worksheets. These tables, for the worksheet that the sheet fabricating machine operates on, are stored in memory 62 and are retrieved from a larger database store 64. Data relating to other types of worksheets which are not being used are likewise stored in database store 64. Historical data collected from the operation of a reference or prototype machine that is substantially the same as the sheet fabrication machine on different types of worksheets are also stored in database store 64.

Also connected to CNC controller 16 is a terminal 66 from which an operator or a programmer can input information or data. Alternatively, a coordinate measuring machine 68 may be connected to terminal 66 for inputting data that is collected from the measurements it did on a given sheet blank such as worksheet 70. Specifically, worksheet 70 is assumed to be a worksheet that has been operated on. The various parts produced therefrom, as indicated for example by 70a, 70b, etc. are measured by coordinate measuring machine 68, which is a conventional machine that measures the required accuracy of the different parts produced from a worksheet, and the relationship of those parts with respect to the worksheet. Processor 58 for CNC controller 16 may be a Pentium, Pentium Pro, or RISC (Reduced Instruction Set Computer) class processor whose processing speed is adaptable to operate the fuzzy logic for determining the parameters for each positioning move based on the historical data and any updated data.

Figure 14A:
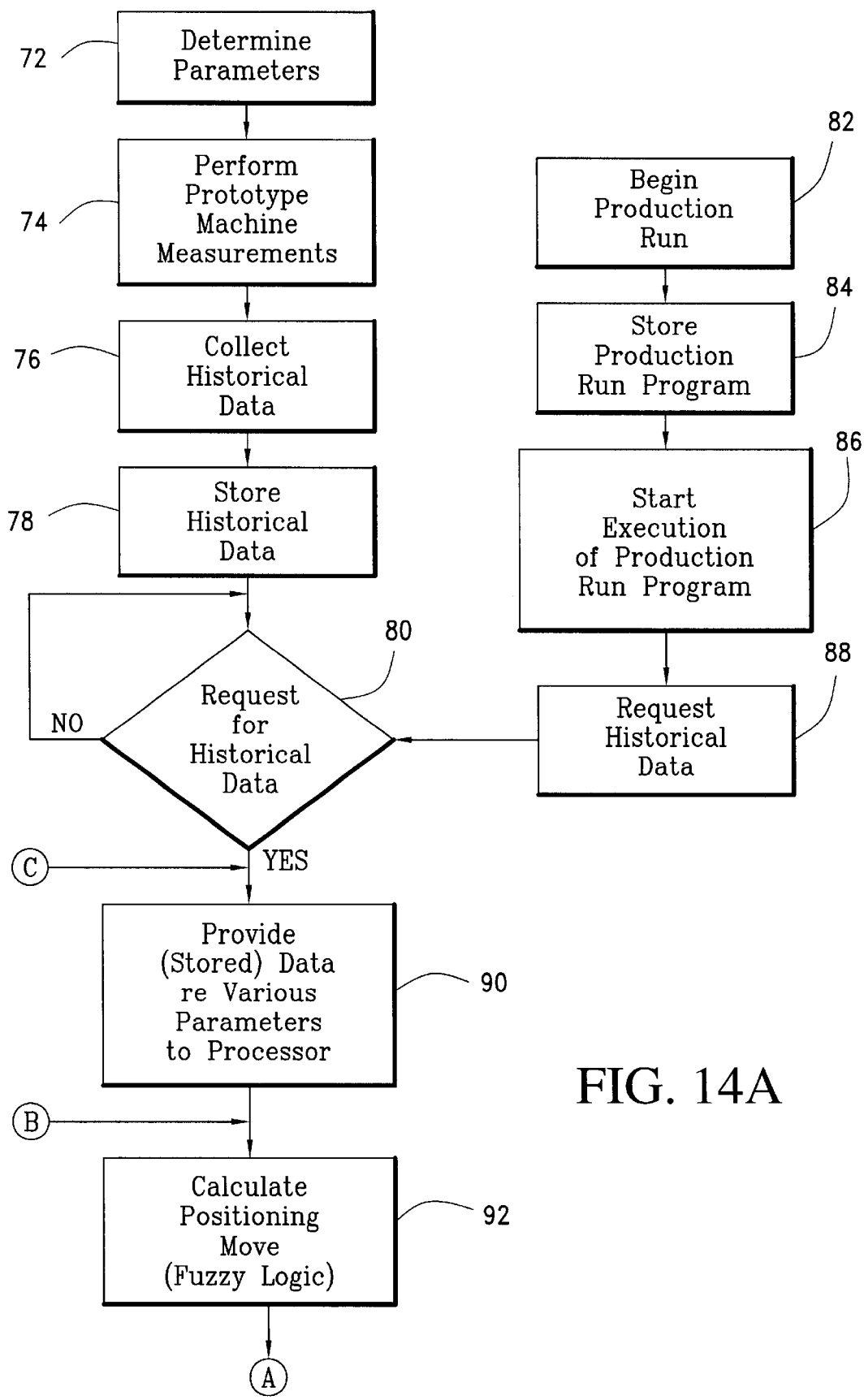
FIGS. 14A and 14B provide a flow chart illustrating the operation of the instant invention.
Figure 14B:
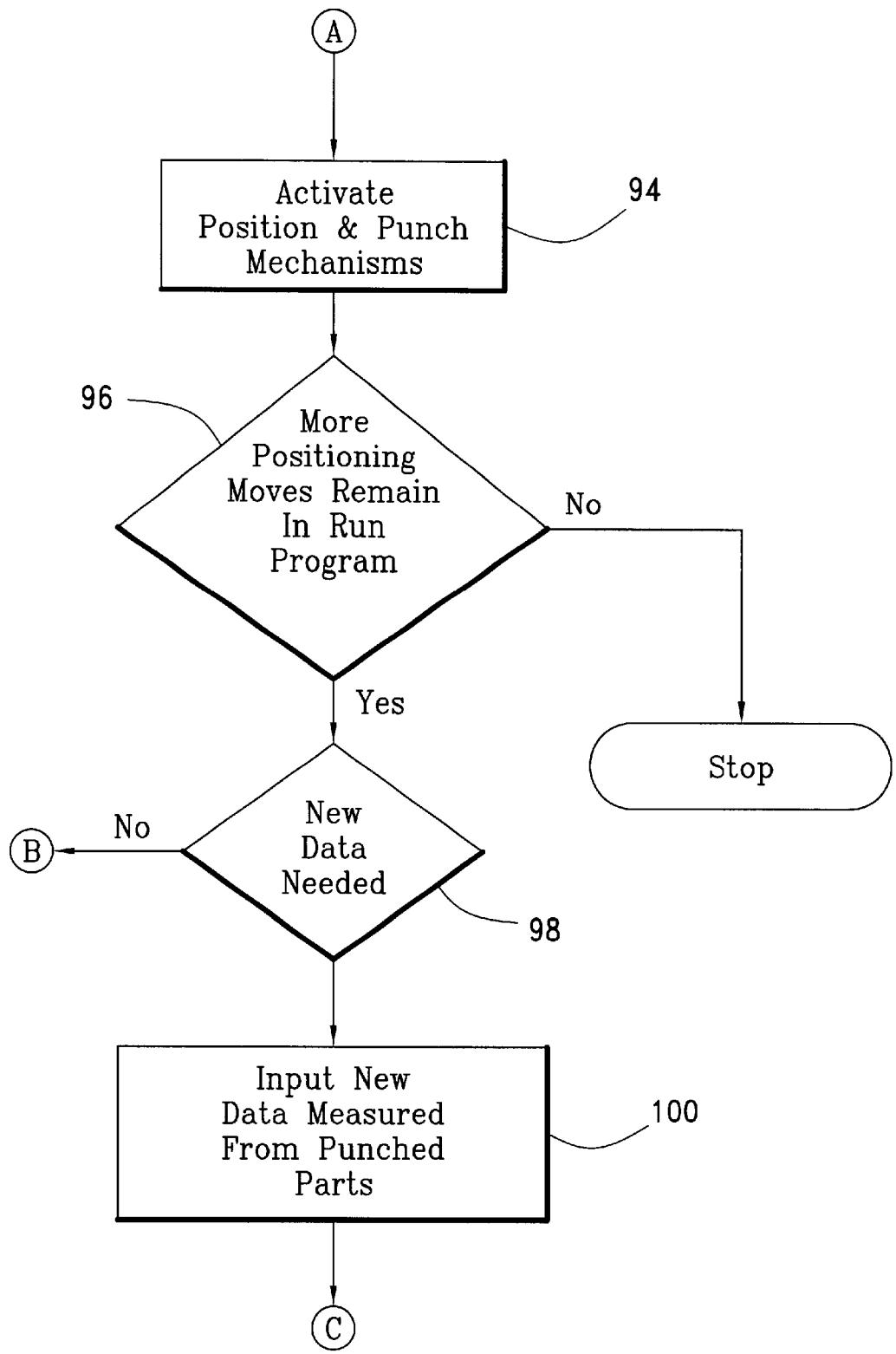

The operation of the present invention is described herein with reference to FIGS. 14A and 14B.

Before any processing, a determination is made on the types of parameters that could affect the positioning moves of a to be fabricated worksheet. This determination of parameters is done in block 72. A measurement of the performance of a reference or prototype machine which is substantially the same as the sheet fabrication machine is performed in block 74 to obtain different sets of parameter data for different types of worksheets. A reference machine may be a first machine having a particular model number such as for example the Finn-Power TP2500I model mentioned above. All subsequent machines manufactured by the manufacturer, for example Finn-Power, having the same model number could therefore use the data measured and collected from that reference machine as its historical data for calculating its positioning moves. This collection of historical data is done in block 76 and the storing of the historical data is done in block 78. With the historical data stored in a database, the control of the sheet fabrication machine awaits any request for historical data in block 80. If there is none, the controller continues to wait.

For the sheet fabrication machine, the operation begins when there is a production run, as indicated in block 82. The production run program, which involves possibly the nesting of the different parts for different types of sheet blanks and the fabrication of different parts from those sheet blanks, is stored in its working memory 62, as indicated in block 84. In block 86, the CNC controller of the machine begins execution of the production run program. It is at this point that historical data is requested from the database store 64, as indicated by block 88. The requested data relating to the various parameters is then retrieved from database store 64 and provided to working memory 62, per block 90. Each positioning move based on the various parameters for moving a workpiece is calculated per block 92 using fuzzy logic. Thereafter, position drive mechanism 52 and punch drive mechanism 56 are activated according to the calculated positioning move per block 94.

After the appropriate location of the worksheet has been positioned under punch 54 by position drive mechanism 52, and after the hole at the appropriate location has been punched by punch drive mechanism 56 with the appropriate time delay, a determination is made on whether additional positioning moves remain to be run in the production run program, per decision block 96. If there is, a determination is made on whether new data is needed per decision block 98. If new data is needed, the new data, as it is measured from the punched parts, or from additional stored data produced from an SPC test, are provided per block 100. Thereafter, the different parameters for the new positioning move is calculated. If no new data is needed in decision block 98, a recalculation of the various parameters is done for the next positioning move. If there are no more positioning moves remaining in the production run program per determination by decision block 96, the fabrication of parts from the worksheet ceases.

Inasmuch as the present invention is subject to may variations, modifications, and changes in detail, it is intended that all matter described throughout the specification and shown in the accompanying drawings be interpreted as illustrative only and not in a limiting sense. Accordingly, it is intended that the invention be limited only by the spirit and scope of the herein appended claims.

What is claimed is:

1. A method of producing parts from a worksheet in at least one sheet fabrication machine comprising the steps of:
   (a) determining a number of parameters which affect each positioning move by said machine to produce parts from said worksheet;
   (b) storing in a memory means of said machine historical data indicative of how each of said parameters affects the accuracy of parts produced from said worksheet by said machine;
   (c) inputting parameter values based on said stored historical data to a processor means of said machine to calculate maximum allowable speed for said each positioning move by said machine to produce parts from said worksheet;
   (d) utilizing said calculated maximum allowable speed for said each positioning move to optimize the minimum safe positioning time for said each positioning move so that parts having the requisite accuracy are produced from said worksheet at the fastest allowable production speed;
   (e) running at least one static process control (SPC) test to produce data from different loads in different conditions for different sheet fabrication machines; and
   (f) using said date from said SPC test to eliminate the differences between said different sheet fabrication machines due to tolerances in the manufacturing of said different sheet fabrication machines to optimize individual positioning moves of each of said different sheet fabrication machines.

2. A method of producing parts from a worksheet in at least one sheet fabrication machine comprising the steps of:
   (a) determining a number of parameters which affect each positioning move by said machine to produce parts from said worksheet;
   (b) storing in a memory means of said machine historical data indicative of how each of said parameters affects the accuracy of parts produced from said worksheet by said machine;
   (c) inputting parameter values based on said stored historical data to a processor means of said machine to calculate maximum allowable speed for said each positioning move by said machine to produce parts from said worksheet;
   (d) utilizing said calculated maximum allowable speed for said each positioning move to optimize the minimum safe positioning time for said each positioning move so that parts having the requisite accuracy are produced from said worksheet at the fastest allowable production speed;
   (e) inputting required hole to hole tolerances for each part to be produced from said worksheet to said processor means; and
   (f) providing fuzzy logic to said processor means to calculate the maximum allowable speed for said each positioning move to achieve said hole to hole tolerances for said each part.

3. A method of producing parts from a worksheet in at least one sheet fabrication machine comprising the steps of:
   (a) determining a number of parameters which affect each positioning move by said machine to produce parts from said worksheet;
   (b) storing in a memory means of said machine historical date indicative of how each of said parameters affects the accuracy of parts produced from said worksheet by said machine;
   (c) inputting parameter values based on said stored historical data to a processor means of said machine to calculate maximum allowable speed for said each positioning move by said machine to produce parts from said worksheet;
   (d) utilizing said calculated maximum allowable speed for said each positioning move to optimize the minimum safe positioning time for said each positioning move so that parts having the requisite accuracy are produced from said worksheet at the fastest allowable production speed; and
   (e) obtaining said historical data from a sample production run performed on a sample worksheet that has substantially the same dimensions and weight as said worksheet by a prototype sheet fabrication machine to which said sheet fabrication machine is modelled after.

4. A method of producing parts from a worksheet in at least one sheet fabrication machine comprising the steps of:
   (a) determining a number of parameters which affect each positioning move by said machine to produce parts from said worksheet;
   (b) storing in a memory means of said machine historical data indicative of how each of said parameters affects the accuracy of parts produced from said worksheet by said machine;
   (c) inputting parameter values based on said stored historical data to a processor means of said machine to calculate maximum allowable speed for said each positioning move by said machine to produce parts from said worksheet;
   (d) utilizing said calculated maximum allowable speed for said each positioning move to optimize the minimum safe positioning time for said each positioning move so that parts having the requisite accuracy are produced from said worksheet at the fastest allowable production speed;
   (e) continuously updating said historical data with data measured from produced parts; and
   (f) adjusting each of said parameters of each upcoming individual positioning move to obtain maximum productivity and required accuracy for parts produced from said worksheet.

5. A method of producing parts from a worksheet in at least one sheet fabrication machine comprising the steps of:
   (a) determining a number of parameters which affect each positioning move by said machine to produce parts from said worksheet;
   (b) storing in a memory means of said machine historical data indicative of how each of said parameters affects the accuracy of parts produced from said worksheet by said machine;
   (c) inputting parameter values based on said stored historical data to a processor means of said machine to calculate maximum allowable speed for said each positioning move by said machine to produce parts from said worksheet;
   (d) utilizing said calculated maximum allowable speed for said each positioning move to optimize the minimum safe positioning time for said each positioning move so that parts having the requisite accuracy are produced from said worksheet at the fastest allowable production speed;

(e) continuously updating said historical data with static process control (SPC) data stored in a SPC data store means; and (f) adjusting each of said parameters of each upcoming individual positioning move to obtain maximum productivity and required accuracy for parts produced from said worksheet.

6. A method of producing parts from a worksheet in at least one sheet fabrication machine comprising the steps of:

(a) determining a number of parameters which affect each positioning move by said machine to produce parts from said worksheet;

(b) storing in a memory means of said machine historical data indicative of how each of said parameters affects the accuracy of parts produced from said worksheet by said machine;

(c) inputting parameter values based on said stored historical data to a processor means of said machine to calculate maximum allowable speed for said each positioning move by said machine to produce parts from said worksheet; and (d) utilizing said calculated maximum allowable speed for said each positioning move to optimize the minimum safe positioning time for said each positioning move so that parts having the requisite accuracy are produced from said worksheet at the fastest allowable production speed;

wherein said parameters comprise data representative of positioning directions, distance between adjacent holes, relative location of each hole to be punched on said worksheet, rigidity of said worksheet, weight of said worksheet, and acceleration and deceleration provided to said each positioning move to compensate for structural deflections and vibrations of said machine and positioning of said worksheet.

7. A method of maximizing the production speed of a sheet fabrication machine for producing parts from a worksheet, comprising the steps of:

(a) storing in a memory means of said machine historical data obtained from a sample production run performed on a sample worksheet that has substantially the same dimensions and weight as said worksheet by a reference sheet fabrication machine that is substantially identical to said fabrication machine, said historical data representative of parameters that affect the accuracy of parts produced from said worksheet;

(b) utilizing said historical data to calculate values of said parameters representative of respective maximum productivity positioning speeds allowed for positioning various portions of said worksheet throughout a work area of said fabrication machine and punching holes at said various portions of said worksheet without any degradation of the accuracy of parts to be produced from said worksheet; and (c) converting said calculated parameter values into respective commands for instructing moving means and punch means of said fabrication machine to position said worksheet and punch holes at various portions thereof at maximized production speed for producing parts from said worksheet each having the requisite accuracy.

8. The method of claim 7, wherein said calculated parameter values comprise data representative of directional movements, distance between adjacent to be punched holes, relative location of each hole to be punched on said worksheet, accelerations and decelerations to be provided as commands to said moving means for moving said worksheet at a maximum productivity positioning speed, and punch speed and punch time delay provided as commands to said punch means to respectively direct the operational speed of said punch means and to prevent said punch means from punching said worksheet before structural deflections and vibrations of said machine and worksheet that cause unacceptable accuracy for parts produced from said worksheet have subsided sufficiently.

9. The method of claim 7, further comprising the step of:

collecting additional data for updating said historical data during the production run of each worksheet by said fabrication machine; and using the updated historical data to calculate new values from said parameters for the production run of each successive worksheet.

10. The method of claim 7, wherein said step (b) further comprises the step of:

using said historical data to estimate each succeeding movement to be effected by said machine to said worksheet so that each movement of said worksheet is at said maximum allowable speed and the dimensions of each part produced from said worksheet is within said requisite accuracy.

11. The method of claim 7, wherein said step (b) utilizes a data processor containing fuzzy logic to calculate the values of said parameters.

12. The method of claim 7, further comprising the steps of:

running a static process control (SPC) test to produce new data for different loads under different conditions if such different loads and conditions are required for subsequent worksheets to be worked on by said fabrication machine; and inputting the new data from said SPC test to said memory means so that said new data can be used to optimize individual positioning moves effected to said worksheet by said machine.

13. The method of claim 12, wherein said new data can be entered continuously when available from produced parts whose resulting dimensions are measured so that the parameter values for each individual positioning move can be adjusted to obtain maximum productivity and the requite accuracy for to be produced parts.

14. The method of claim 12, further comprising the steps of:

storing said new data in a SPC data store; and inputting said new data from said SPC database store to said memory means so that the parameter values for each individual positioning move can be adjusted to obtain maximum productivity and the requite accuracy for to be produced parts.

15. The method of claim 7, further comprising the steps of:

running at least one static process control (SPC) test to produce data from different loads in different conditions for other machines similar to said sheet fabrication machine; and using said data from said SPC test to eliminate the differences due to tolerances in the manufacturing of said other machines and said sheet fabrication machine so that respective positioning moves for each of said machines are optimized.

16. A method of maximizing the speed with which worksheets are moved and machined by a sheet fabrication center to produce parts whose dimensions are within a predetermined accuracy, comprising the steps of:

(a) directing moving means and machining means of an exemplar sheet fabrication center that is substantially identical to said fabrication center to move and machine an exemplar worksheet that has substantially the same dimensions and weight as said worksheets throughout a work area of said exemplar fabrication center for producing exemplar parts from said exemplar worksheet;

(b) measuring the dimensions of said exemplar parts produced from said exemplar worksheet;

(c) determining if the dimensions of said exemplar parts are within said predetermined accuracy;

(d) collecting data relating to how said exemplar parts were produced from said exemplar worksheet if the respective dimensions of said exemplar parts are within said predetermined accuracy;

(e) storing the collected data of said exemplar parts as historical base data; and (f) utilizing the stored historical data for estimating successive optimal combinations of parameter values for instructing moving means and machining means of said fabrication center to effect corresponding successive operations to each one of said worksheets so that parts are produced from said each worksheet at a maximum production rate without the accuracy or the dimensions of said produced parts being affected by structural deflections and vibrations of said fabrication center and the movement of said each worksheet.

17. A sheet fabrication machine for producing parts from at least one worksheet, comprising:

means for moving and machining said one worksheet;

memory means for storing identified parameters which affect each positioning move by said moving and machining means to produce parts from said one worksheet and historical data indicative of how each of said parameters affects the accuracy of parts produced from a worksheet by said machine;

processor means using said stored historical data to calculate maximum allowable speed for said each positioning move to optimize the minimum safe positioning time for said each positioning move, said processor means providing said calculated maximum allowable speed for said each positioning move as instructions to said moving and machining means to produce parts having the requisite accuracy from said one worksheet at the fastest allowable production speed;

means for running at least one static process control (SPC) test to produce data from different loads in different conditions for different sheet fabrication machines; and comparison means for using said data from said SPC test to eliminate the differences between said different sheet fabrication machines due to tolerances in the manufacturing of said different sheet fabrication machines to optimize individual positioning moves of each of said different sheet fabrication machines.

18. A sheet fabrication machine for producing parts from at least one worksheet, comprising:

means for moving and machining said one worksheet;

memory means for storing identified parameters which affect each positioning move by said moving and machining means to produce parts from said one worksheet and historical data indicative of how each of said parameters affects the accuracy of parts produced from a worksheet by said machine;

processor means using said stored historical data to calculate maximum allowable speed for said each positioning move to optimize the minimum safe positioning time for said each positioning move, said processor means providing said calculated maximum allowable speed for said each positioning move as instructions to said moving and machining means to produce parts having the requisite accuracy from said one worksheet at the fastest allowable production speed;

interface means for inputting required hole to hole tolerances for each part to be produced from said worksheet to said processor means; and a fuzzy logic module provided to said processor means to calculate the maximum allowable speed for said each positioning move to achieve said hole to hole tolerances for said each part.

19. A sheet fabrication machine for producing parts from at least one worksheet, comprising:

means for moving and machining said one worksheet;

memory means for storing identified parameters which affect each positioning move by said moving and machining means to produce parts from said one worksheet and historical data indicative of how each of said parameters affects the accuracy of parts produced from a worksheet by said machine; and processor means using said stored historical data to calculate maximum allowable speed for said each positioning move to optimize the minimum safe positioning time for said each positioning move, said processor means providing said calculated maximum allowable speed for said each positioning move as instructions to said moving and machining means to produce parts having the requisite accuracy from said one worksheet at the fastest allowable production speed;

wherein said historical data comprises data resulting from a sample production run performed on a sample worksheet that has substantially the same dimensions and weight as said one worksheet by a prototype sheet fabrication machine to which said sheet fabrication machine is modelled after.

20. A sheet fabrication machine for producing parts from at least one worksheet, comprising:

means for moving and machining said one worksheet;

memory means for storing identified parameters which affect each positioning move by said moving and machining means to produce parts from said one worksheet and historical data indicative of how each of said parameters affects the accuracy of parts produced from a worksheet by said machine;

processor means using said stored historical data to calculate maximum allowable speed for said each positioning move to optimize the minimum safe positioning time for said each positioning move, said processor means providing said calculated maximum allowable speed for said each positioning move as instructions to said moving and machining means to produce parts having the requisite accuracy from said one worksheet at the fastest allowable production speed;

input means for continuously updating said historical data with data measured from produced parts;

said processor means adjusting the value of each of said parameters of each upcoming individual positioning move to obtain maximum productivity and required accuracy for parts produced from said worksheet.

21. A sheet fabrication machine for producing parts from at least one worksheet, comprising:

means for moving and machining said one worksheet;

memory means for storing identified parameters which affect each positioning move by said moving and machining means to produce parts from said one worksheet and historical data indicative of how each of said parameters affects the accuracy of parts produced from a worksheet by said machine;

processor means using said stored historical data to calculate maximum allowable speed for said each positioning move to optimize the minimum safe positioning time for said each positioning move, said processor means providing said calculated maximum allowable speed for said each positioning move as instructions to said moving and machining means to produce parts having the requisite accuracy from said one worksheet at the fastest allowable production speed;

a static process control (SPC) data store means for storing SPC data; and input means for continuously updating said historical data with said stored SPC data;

said processor means adjusting the value of each of said parameters of each upcoming individual positioning move to obtain maximum productivity and required accuracy for parts produced from said worksheet.

22. A sheet fabrication machine for producing parts from at least one worksheet, comprising:

means for moving and machining said one worksheet;

memory means for storing identified parameters which affect each positioning move by said moving and machining means to produce parts from said one worksheet and historical data indicative of how each of said parameters affects the accuracy of parts produced from a worksheet by said machine; and processor means using said stored historical data to calculate maximum allowable speed for said each positioning move to optimize the minimum safe positioning time for said each positioning move, said processor means providing said calculated maximum allowable speed for said each positioning move as instructions to said moving and machining means to produce parts having the requisite accuracy from said one worksheet at the fastest allowable production speed;

wherein said parameters comprise data representative of positioning directions, distance between adjacent holes, relative location of each hole to be punched on said worksheet, rigidity of said worksheet, weight of said worksheet, and acceleration and deceleration provided to said each positioning move to compensate for structural deflections and vibrations of said machine and positioning of said one worksheet.

23. Apparatus for maximizing the production speed of a sheet fabrication machine for producing parts from a worksheet, comprising:

memory means for storing historical data collected from a sample production run performed on a sample worksheet that has substantially the same dimensions and weight as said worksheet by a reference sheet fabrication machine that is substantially identical to said fabrication machine, said historical data representative of parameters that affect the accuracy of parts produced from said worksheet; and processor means for utilizing said historical data to calculate values of said parameters representative of respective maximum production speeds allowed for positioning various portions of said worksheet throughout a work area of said fabrication machine and punching holes at said various portions of said worksheet without any degradation of the accuracy of parts to be produced from said worksheet, said processor means further converting said calculated parameter values into respective commands for instructing moving means and punch means of said fabrication machine to position said worksheet and punch holes at various portions thereof at maximized production speed for producing parts from said worksheet each having the requisite accuracy.

24. Apparatus of claim 23, wherein said calculated parameter values comprise data representative of directional movements, distance between adjacent to be punched holes, relative location of each hole to be punched on said worksheet, accelerations and decelerations to be provided as commands to said moving means for moving said worksheet at a maximum production speed, and punch speed and punch time delay provided as commands to said punch means to respectively direct the operational speed of said punch means and to prevent said punch means from punching said worksheet before structural deflections and vibrations of said machine and worksheet that cause unacceptable accuracy for parts produced-from said worksheet have subsided sufficiently.

25. Apparatus of claim 23, further comprising:

means for collecting additional data for updating said historical data during the production run of each worksheet by said fabrication machine;

said processor means using the updated historical data to calculate new values from said parameters for the production run of each successive worksheet.

26. Apparatus of claim 23, wherein said processor means further uses said historical data to estimate each succeeding movement to be effected by said machine to said worksheet so that each movement of said worksheet is at said maximum allowable production speed and the dimensions of each part produced from said worksheet is within said requisite accuracy.

27. Apparatus of claim 23, wherein said processor means comprises a fuzzy logic module for calculating the values of said parameters.

28. Apparatus of claim 23, further comprising:

test means for running a static process control (SPC) test to produce new data for different loads at different conditions if such different loads and conditions are required for subsequent worksheets to be worked on by said fabrication machine; and comparison means for inputting the new data from said SPC test to said memory means so that said new data can be used to optimize individual positioning moves effected to said worksheet by said machine.

29. Apparatus of claim 28, wherein said new data can be entered continuously when available from produced parts whose resulting dimensions are measured so that the parameter values for each individual positioning move can be adjusted to obtain maximum productivity and the requite accuracy for to be produced parts.

30. The apparatus of claim 28, further comprising:

a SPC data store for storing said new data; and input means for inputting said new data from said SPC data store to said memory means so that the parameter values for each individual positioning move can be adjusted to obtain maximum productivity and the requite accuracy for to be produced parts.

31. The apparatus of claim 23, further comprising:

test means for running at least one static process control (SPC) test to produce data from different loads in different conditions for other machines similar to said sheet fabrication machine; and using said data from said SPC test to eliminate the differences due to tolerances in the manufacturing of said other machines and said sheet fabrication machine so that respective positioning moves for each of said machines are optimized.

* * * * *